United States Patent [19]

Murata et al.

[11] Patent Number: 5,717,442
[45] Date of Patent: Feb. 10, 1998

[54] RECORDING APPARATUS

[75] Inventors: Shinji Murata, Tokyo; Yoshihiko Yoshihara, Yokohama, both of Japan

[73] Assignee: Canon Kabushiki Kaisha, Tokyo, Japan

[21] Appl. No.: 373,505

[22] Filed: Jan. 17, 1995

Related U.S. Application Data

[63] Continuation of Ser. No. 917,336, Jul. 23, 1992, abandoned.

[30] Foreign Application Priority Data

Jul. 30, 1991 [JP] Japan .................. 3-211431
Sep. 18, 1991 [JP] Japan .................. 3-265516

[51] Int. Cl.⁶ .................. G09G 3/06; G03B 27/32; H04N 1/00
[52] U.S. Cl. .................. 346/49; 355/64; 358/403; 358/449
[58] Field of Search .................. 346/44; 347/5; 355/64; 358/75, 403, 449, 451, 452; 364/285.3, 236.2; 395/117

[56] References Cited

U.S. PATENT DOCUMENTS

| | | | |
|---|---|---|---|
| 4,521,805 | 6/1985 | Ayata et al. | 358/75 |
| 4,783,686 | 11/1988 | Ishii et al. | 355/64 |
| 5,053,885 | 10/1991 | Telle | 358/449 |
| 5,126,540 | 6/1992 | Kashiwagi et al. | 235/375 |
| 5,140,430 | 8/1992 | Horii et al. | 358/296 |
| 5,150,221 | 9/1992 | Shima | 358/403 |

*Primary Examiner*—Joseph W. Hartary
*Assistant Examiner*—Craig A. Hallacher
*Attorney, Agent, or Firm*—Fitzpatrick, Cella, Harper & Scinto

[57] ABSTRACT

A recording apparatus is provided with plural recording units. A supplied original is discriminated by an original discriminating unit, and is recorded by a recording unit selected according to the result of the discrimination by the discriminating unit. The plural recording units are mutually different in the recording image magnification or in the recording method.

37 Claims, 11 Drawing Sheets

RECORDING APPARATUS

This application is a continuation of prior application Ser. No. 07/917,336 filed Jul. 23, 1992, now abandoned.

BACKGROUND OF THE INVENTION

1. Field of the Invention

The present invention relates to a recording apparatus for recording the image of an original onto a recording medium such as a microfilm or a magneto-optical disk.

2. Related Background Art

In the category of such recording apparatus, there are already known those capable of photographing or recording objects from a large size (about A3 size), such as a sheet original, to a small size (about B6 size), as exemplified by (1) a rotary microfilm camera, and (2) an image scanner for computer input.

The above-mentioned image scanners for computer input are classified according to the original size, such as that for A3 size and that-for A4 size, because the resolving power is lost if an object of A4 size is read and recorded with the image scanner for A3 size.

Also, the above-mentioned rotary camera allows simultaneous recording in two cameras, but a camera with a low reduction rate is used in a case of recording a small object with a large camera.

Therefore, in the conventional rotary camera, if the objects are present in two or more different sizes, there are required two or more exclusive cameras, or there is required a cumbersome operation of selecting and replacing cameras of different reduction rates.

Also, in the conventional image scanner for computer input, there are required plural image scanners according to the original sizes, since, if a small object is scanned with a large-sized image scanner, the number of effective elements of the image scanner is decreased proportionally to the original size, thus deteriorating the resolving power. Also, the image scanner of a high resolving power is expensive, and there is required a conversion unit for an input device with a different number of elements.

Also, in such a conventional apparatus, the phototaking speed of a phototaking unit for analog recording on a photosensitive material such as a microfilm (such unit being hereinafter called an analog phototaking unit) does not depend on the amount of information on the object image, while the phototaking speed of an image scanner provided with an image sensor and a magneto-optical recording unit (hereinafter called a digital phototaking unit) depends on the amount of information of the object image. The phototaking speed of such a digital phototaking unit is generally lower than that of the analog phototaking unit, and is often significantly lowered if the original image contains a large amount of information, such as a photographic image or a color image. The phototaking operation itself may eventually become impossible if the recording speed of the digital phototaking unit cannot catch up with the amount of information of the object image. Such a phenomenon becomes conspicuous in an apparatus for continuously recording the objects.

Also, the digital recording is superior to the analog recording, exemplified by the micro-film, in the speed of retrival of the recorded images after the recording, but such superiority is limited to one cartridge in a case of a tape-shaped recording medium such as a VCR tape, an 8 mm tape or a DAT, or one disk in a case of a disk-shaped medium such as an optical disk or a magnetooptical disk, and is not exhibited in case a of using plural media. On the other hand, the digital recording is associated with drawbacks of inferior long-term storage ability and of requiring careful handling as the medium is easily damaged. Thus, the analog recording, represented by the microfilm, is often more convenient for use, as the analog recording is inferior in the recording speed.

For these reasons, there has been a need for an input apparatus that has the advantages of the analog and digital recordings.

SUMMARY OF THE INVENTION

In consideration of the foregoing, an object of the present invention is to provide a recording apparatus capable of recording an object (original) with different recording methods, according to the kind of such an original.

According to the present invention, there is provided a recording apparatus provided with plural recording units and object discrimination means such as means for detecting the length or width of the object, means for detecting the top or rear face of the object, means for detecting a bar code on the object, optical character reader means or combinations thereof, wherein said plural recording units are automatically switched according to the information from said object discrimination means.

Another object of the present invention is to provide a recording apparatus capable of automatically switching digital recording and analog recording, according to the amount of objects or the state of image contained in the object.

DESCRIPTION OF THE PREFERRED EMBODIMENTS

Figure 1:
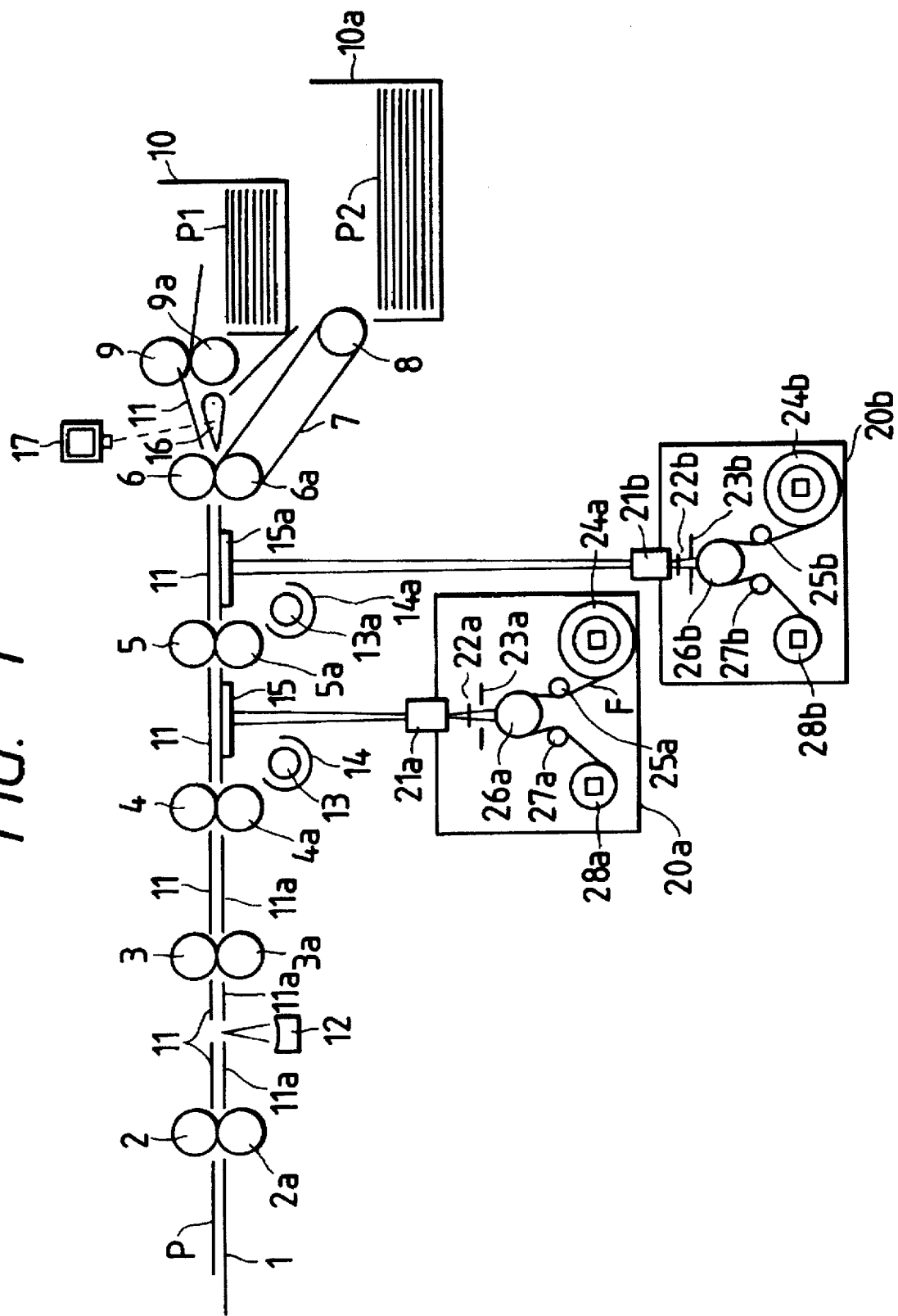
FIG. 1 is a schematic view of a first embodiment of the recording apparatus of the present invention, in which plural rotary cameras of different reduction rates are combined.

In the following there will be explained, with reference to FIG. 1, a first embodiment of the present invention, consisting of the combination of a rotary camera of a high image reduction rate and a rotary camera of a low image reduction rate.

An upper transport roller 2 and a lower transport roller 2a positioned in a pair, transport an object P on an object feed table. Also, upper transport rollers 3, 4, 5 and lower transport rollers 3a, 4a, 5a are positioned in pairs along the object transport path, and between these paired transport rollers there are provided upper transport guides 11 and lower transport guides 11a for guiding the object P to the next paired transport rollers. Said upper transport rollers 2–5 and lower transport rollers 2a–5a are driven with the same speed by an unrepresented driving source. At the downstream side of the transport rollers 5, 5a and across the transport guides 11, 11a, there are provided upper and lower drive rollers 6, 6a which drive a conveyor belt 7 supported by a belt supporting roller 8. Also, at the downstream side of the drive rollers 6, 6a and across an upper guide 11, there are provided upper and lower drive rollers 9, 9a. At the exit side of said drive rollers 9, 9a there is provided a low reduction rate object stacker 10 for shorter objects P1, and, at the exit side of the conveyor belt 7 is provided a high reduction rate object stacker for longer objects P2.

A reflective object sensor 12 is provided between the transport rollers 2, 2a and those 3, 3a, for detecting the front end and the rear end of the original P, thereby detecting the length thereof. Illuminating light sources 13, 13a and mirrors 14, 14a are provided to illuminate the original P through glass guide plates 15, 15a, respectively between the paired transport rollers 4, 4a and 5, 5a and between those 5, 5a and 6, 6a. A classifying gate 16 is provided between the paired drive rollers 6, 6a and those 9, 9a and is vertically displaced by a solenoid 17 through an unrepresented link mechanism thereby sorting the originals P into the stacker 10 or 10a.

A low reduction rate camera unit 20a and a high reduction rate camera unit 20b are positioned in places convenient for operation, utilizing unrepresented mirrors positioned in the optical paths.

In the low reduction rate camera unit 20a, there are provided a phototaking system including a low reduction rate lens 21a, a shutter 22a and an aperture slit 23a for slit exposure, and a film feeding system including a supply reel 24a for a film F, a positioning guide roller 25a, a drive roller 26a defining the focal plane, another positioning guide roller 27a and a takeup reel 28a, which are positioned along a film transport path. In the high reduction rate camera unit 20b, there are provided a phototaking system including a high reduction rate lens 21b, a shutter 22b and an aperture slit 23b for slit exposure, and a film feeding system including a supply reel 24b for a film F, a positioning guide reel 25b, a drive roller 26b defining the focal plane, another positioning guide roller 27b and a takeup reel 28b. The cameras 20a, 20b effect slit exposure on the films on the drive rollers 26a, 26b, through the glass guide plates 15, 15a and lenses 21a, 21b.

The present embodiment explained above functions in the following manner. The original P is transported by the transport rollers 2, 2a, and, when the front end is detected by the original sensor 12, timers for the cameras 20a, 20b are set for the periods corresponding to the distances to the exposure positions of respective cameras and initiate a decreasing count. The time from the detection of the front end to that of the rear end by said sensor 12 is compared with predetermined reference data, for identifying whether the phototaking is conducted with a high reduction or a low reduction rate. If the low reduction rate is identified, the camera 20b is selected, while the timer for the camera 20a is reset to cancel the stand-by state for the camera 20a.

When the front end of the original P reaches the glass guide plate 15 at the right of the transport rollers 4, 4a, the film F is driven by the drive roller 26a with a speed corresponding to the speed of the original divided by the reduction rate. At the same time, the shutter 22a is opened by an unrepresented plunger, whereby the image of the original is focused on the film and slit exposure is executed. The film F after phototaking is wound on the takeup reel 28a, and the film F and the shutter 22a are deactivated after a period corresponding to the length of the original P detected by the sensor 12. When the original of a smaller size is transported, the camera 20a is selected and the phototaking operation with the low reduction rate is conducted.

The original P, after passing the phototaking position of the camera 20a, passes through the transport rollers 5, 5a and the phototaking position of the deactivated camera 20b, and is sent to the upper stacker 10 by the gate 16 at the downstream side of the drive rollers 6, 6a. Also, when the original of a longer side is transported, the camera 20b is selected and effects phototaking with the high reduction rate, and the original is thereafter sent to and stored in the lower stacker 10a.

Through the above-explained operations, the smaller objects such as checks and business forms are automatically recorded by the low reduction rate camera unit 20a and are collected in the upper stacker 10, while the larger objects such as documents are recorded by the high reduction rate camera unit 20b and stored in the lower stacker 10a. Thus, there can be employed compact cameras convenient for use, as the phototaking operations are automatically conducted without requiring attention to the image reduction rate of the camera.

Figure 2:
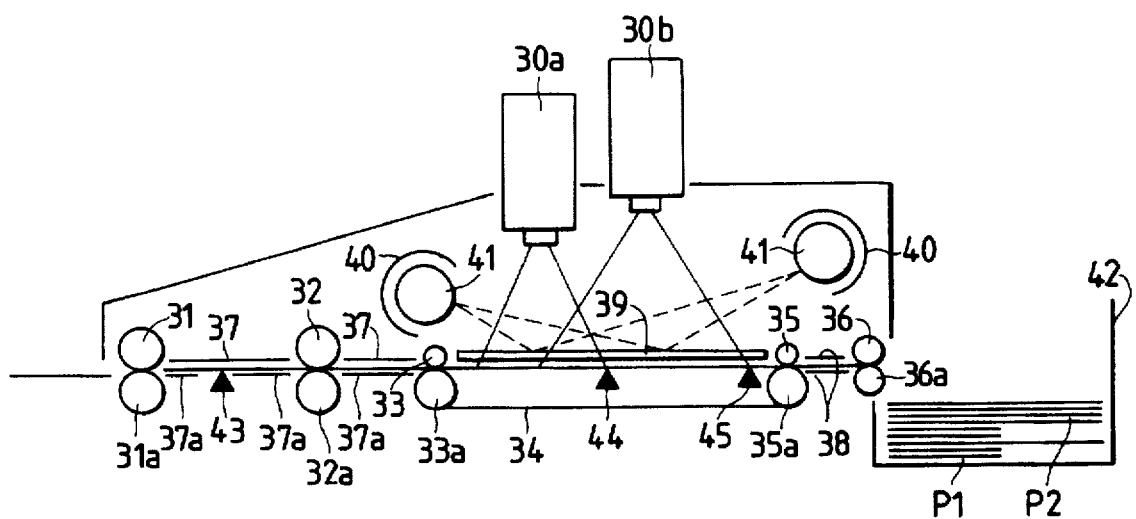
FIG. 2 is a schematic view of a second embodiment of the recording apparatus of the present invention, in which plural flat bed cameras of different reduction rates are combined.
Figure 3:
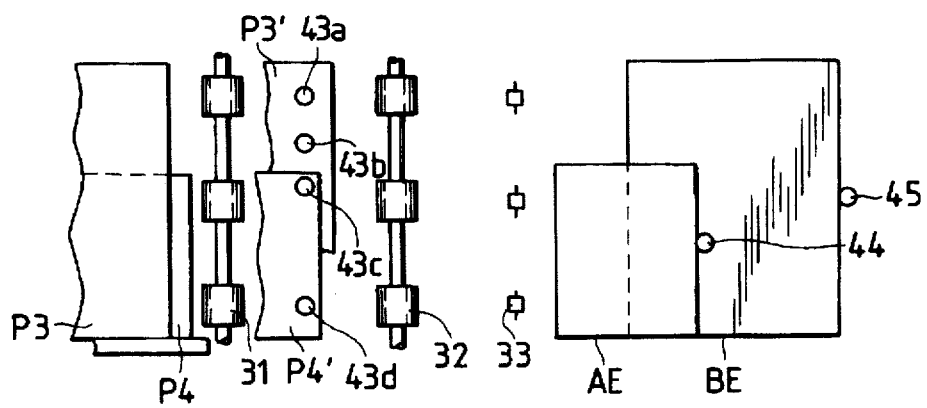
FIG. 3 is a partial plan view showing an example of an discrimination of object width therein.

FIGS. 2 and 3 illustrate a second embodiment of the present invention, employing flat bed cameras of high and low reduction rates.

There are illustrated a static exposure camera unit 30a with a low reduction rate, and another static exposure camera unit 30b with a high reduction rate. Upper rollers 31, 32, 33, 35 and lower drive rollers 31a, 32a, 33a and a lower roller 35a are provided in pairs, along the original transport path, and a drive belt 34 is supported between the lower drive roller 33a and the lower roller 35a. Above said drive belt 34 there are provided the camera units 30a, 30b. At the downstream side of the rollers 35, 35a there are provided an upper discharge roller 36 and a lower discharge drive roller 36a. Among the rollers 31–33 and 31a–33a there are provided upper guide plates 37 and lower guide plates 37a, and between the rollers 35, 35a and 36, 36a there are provided exit guide plates 38. Also, on the drive belt 34 there is provided a flat glass guide 39. Reflectors 40 and illuminating light sources 41 are provided in pairs at left and at right, for illuminating the flat glass guide 39 constituting the phototaking object plane. A stacker 42 contains smaller originals P1 and larger originals P2. An original sensor 43 is provided on the lower guide plate 37a between the rollers 31a and 32a, and position sensors 44, 45 are provided in the phototaking areas of the camera units 30a, 30b on the drive belt 34.

In the above-explained configuration, the drive roller 31a is driven through an unrepresented clutch, and is rotated when the original is not present in the flat glass guide 39. When an original is fed between the rollers 31, 31a, the length of said original is detected by the sensor 43, from the product of the original transporting speed by time.

The advancing original is stopped below the camera unit 30a or 30b, depending on the length of said original. If the sensor 43 identifies a long original, all the drive rollers are stopped when the original reaches the position sensor 45, whereupon the phototaking operation is conducted by the camera unit 30b. After the phototaking operation, the drive rollers 33, 35, drive belt 34 and discharge drive roller 36 are again activated to discharge the original to the stacker 42. Also, there may be employed classified stackers as shown in FIG. 1.

Also, if the sensor 43 identifies a short original, all the drive rollers are stopped when the original reaches the position sensor 44 and the phototaking operation is executed by the camera unit 30a. After the phototaking operation, the discharge is conducted to the stacker 42 as in the case of a long original P2.

If the long and short originals are of fixed formats, the originals may be identified by the widths thereof as shown in FIG. 3. In FIG. 3, there are shown width sensors 43a, 43b, 43c, 43d, an original P3 of a large width, and an original P4 of a small width. P3' indicates a state of the original P3 transported by the upper roller 31, and P4' indicates a state of the original P4 transported by the upper roller 31.

In the state P4' the sensors 43c, 43d detect the object while the sensors 43a, 43b do not detect the object. In the state P3', all the sensors 43a–43d detect the object, and the width can be detected in this manner. Thereafter the original P4' is stopped by the sensor 44 upon arrival at a position AE, while the original P3' is stopped by the sensor 45 at a position BE.

A convenient and compact photographing apparatus can thus be provided, as the objects of different forms can be automatically classified and recorded.

An even compactor configuration can be realized, in a case of the flat bed cameras, by over-lapping the image areas of the camera units 30a, 30b, and a higher resolving power can be realized in the still exposure than in the slit exposure.

Figure 4:
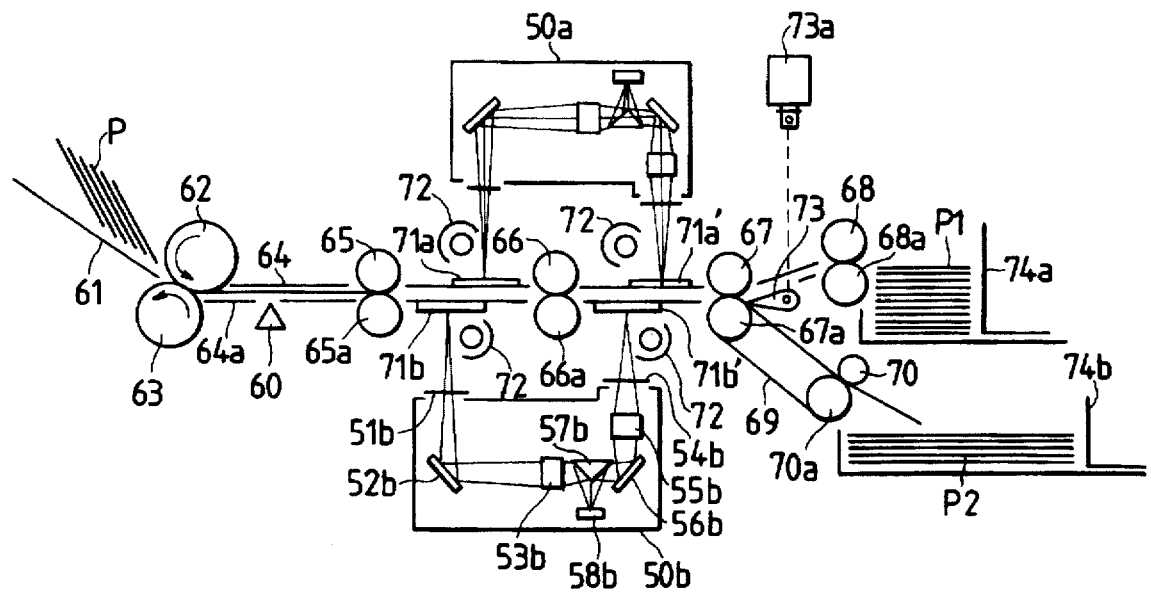
FIG. 4 is a schematic view of a third embodiment of the recording apparatus of the present invention, in which image reading devices of different reduction rates are provided on top and bottom sides.

FIG. 4 shows a third embodiment of the present invention, employing image readers of different reduction rates, consisting of photoelectric converting devices (image sensors) such as a CCD.

The same image converting units 50a, 50b are symmetrically provided in the vertical direction, with respect to an original transport path, so that the lower one 50b alone will be explained in the following. The light reflected from an original P, illuminated by an illuminating unit 72 through a lower guide glass 71b, is transmitted by a high reduction rate shutter 51b, then deflected by a mirror 52b, condensed by a high reduction rate lens 53b, reflected by a left face of a prism 57b and introduced into a photoelectric converting device (CCD) 58b. On the other hand, the light reflected from the original P, illuminated through a lower guide glass 71b', is transmitted by a low reduction rate shutter 54b and a low reduction rate lens 55b, then reflected by a mirror 56b and a right face of the prism 57b and focused on the CCD 58b. Said lenses 53b, 55b have such reduction rates that the recording areas of two different widths are imaged on the entire effective area of the CCD. Also, the shutters 51b, 54b do not function at the same time.

Originals P are fed into the apparatus in succession, by an entrance guide plate 61, a feed roller 62 and a reverse separating roller 63, constituting an automatic feed unit. The original P thus supplied passes between an upper guide plate 64 and a lower guide plate 64a, then is further transported by transport rollers 65, 65a to the downstream side, and an original sensor 60 detects the presence or absence of the original and the length thereof in the course of said transportation. Then, according to the detected length, the shutter 51b or 54b is actuated respectively for a long or short original, and the image is focused on the photoelectric converting device 58b and is converted during the passing time of the original P in the course of passing on the lower guide glass 71b'. The image converting unit 50a is simultaneously activated. However, if the original does not bear the image on the bottom face, the image converting unit 50a alone is activated.

The original P after image conversion is transported by transport rollers 66, 66a, and is discharged by discharge rollers 67, 67a. At the exit side there is provided a sorting guide 73 which is vertically rotated by a plunger 73a and which is shifted downwards as illustrated, in case a short original P1 is detected by the sensor, thereby guiding the original P1 upwards. Said original P1 is stacked into a stacker 74a for shorter originals, by means of discharge rollers 68, 68a.

On the other hand, for a long original P2, the shutter 51b is activated and the image of the original is focused on the photoelectric converting device 58b through the high reduction rate lens 53b. In this case, the sorting guide 73 rotates upwards to guide the original P2 downwards, which is transported by a conveyor belt 69, a roller 70a and a pressing roller 70, and is stacked in a stacker 74b for the longer original.

The above-explained configuration allows storage into the memory, by sorting the originals into longer ones such as A4-sized documents and shorter ones such as checks and business forms, utilizing the same number of photoelectric converting elements. It is therefore possible to efficiently record the objects of different sizes into the memory with the same number of bit data, and also to separate the memories according to the size of the originals. Also, the efficiency of retrieval can be greatly improved since the mixed originals and the files are automatically classified. Furthermore, efficient recording can be achieved even when the apparatus of the present embodiment is used in two or more locations in cooperation.

Figure 5:
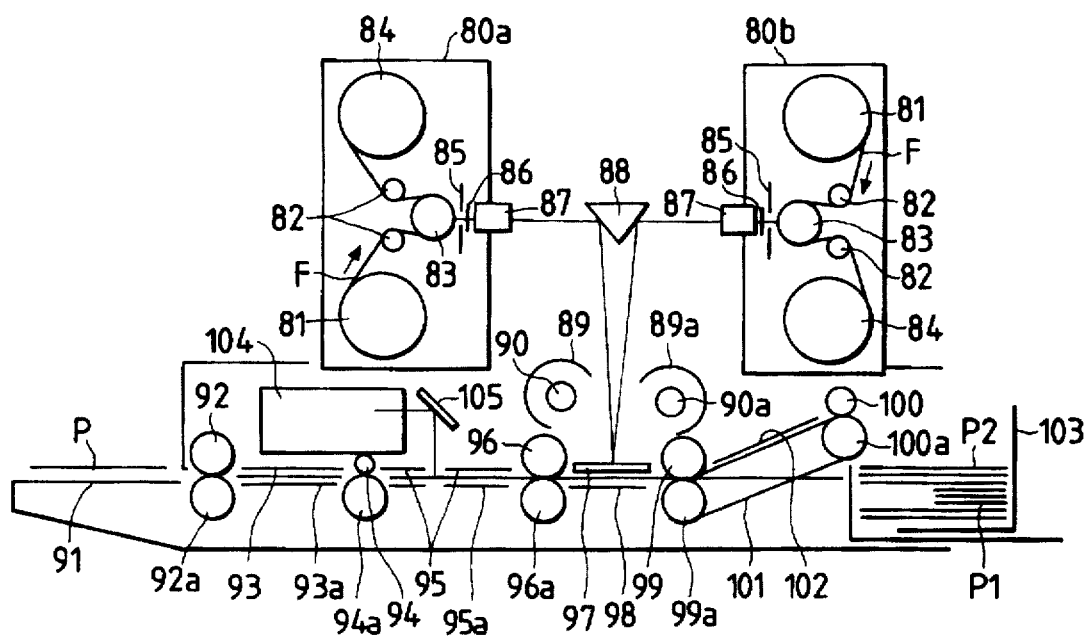
FIG. 5 is a schematic view of a fourth embodiment of the recording apparatus of the present invention, employing two rotary cameras of a the same reduction rate.

FIG. 5 shows a fourth embodiment of the present invention, in which originals bearing identifying bar codes are selectively photographed by either of two rotary microfilm cameras of the same reduction rate.

Microfilm camera units 80a, 80b of the same image reduction rate are positioned at left and at right. The configurations of said camera units are represented by the same numbers, and the unit 80a alone will be explained in the following.

There are provided a supply reel 81 for a film F; paired guide rollers 82; drive rollers 83 for effecting slit exposure and advancing the film at a synchronized speed; a takeup reel 84 for winding the exposed film; a slit 85 for slit exposure; a shutter 86; an imaging lens 87; a light path splitting prism (or mirror) 88 so designed as to allow the camera units 80a, 80b to take the same image of the same original; mirrors 89, 89a for improving the efficiency of illumination and protecting the camera units from unnecessary light; light sources 90, 90a for illuminating the original; a table 91 for supporting the original; paired transport rollers 92, 92a, 94, 94a, 96, 96a, 99, 99a arranged along the original transport path; upper and lower guide plates 93, 93a positioned between the paired transport rollers 92, 92a and 94, 94a; upper and lower guide plates 95, 95a with a central slit, positioned between the paired transport rollers 94, 94a and 96, 96a; an upper glass guide plate 97 constituting an exposure aperture and a lower guide plate 98 positioned between the paired transport rollers 96, 96a and 99, 99a; paired discharge rollers 100, 100a; a belt 101 supported by the roller 99a serving as a drive roller and the roller 100a; an upper guide plate 102 positioned thereabove; a stacker 103 for stacking the discharged originals; a bar code scanner 104 for reading a bar code on the original; and a mirror 105 positioned above the slit of said upper and lower guide plates 95, 95a, for deflecting the light to said scanner.

In the above-explained configuration, the original P is transported by the transport rollers 92, 92a between the guide plates 93, 93a and the front end is detected by an unrepresented original sensor. Then the original P is transported by the transport rollers 94, 94a, and the bar code on said original is read at the slit provided in the guide plates 95, 95a, whereby the camera unit 80a or 80b is selected. When the original P reaches the glass guide plate 97, the shutter 86 of the selected camera unit 80a or 80b is actuated. The film F is advanced by a predetermined amount corresponding to the original and is thus exposed. The original P is advanced without stopping, then is lifted by the belt 101 and discharged into the stacker 103.

In the present embodiment, the camera units are automatically switched according to the number or classification of the bar codes on the originals P, whereby the phototaking operations can be made in a continuous manner without film editing. For example, the originals numbered as 1 to 100 are photographed by the camera unit 80a, and those numbered as 101 to 200 are photographed by the camera unit 80b.

Also, the business forms of two business sections can be automatically classified by including the section in the bar code.

Figure 6:
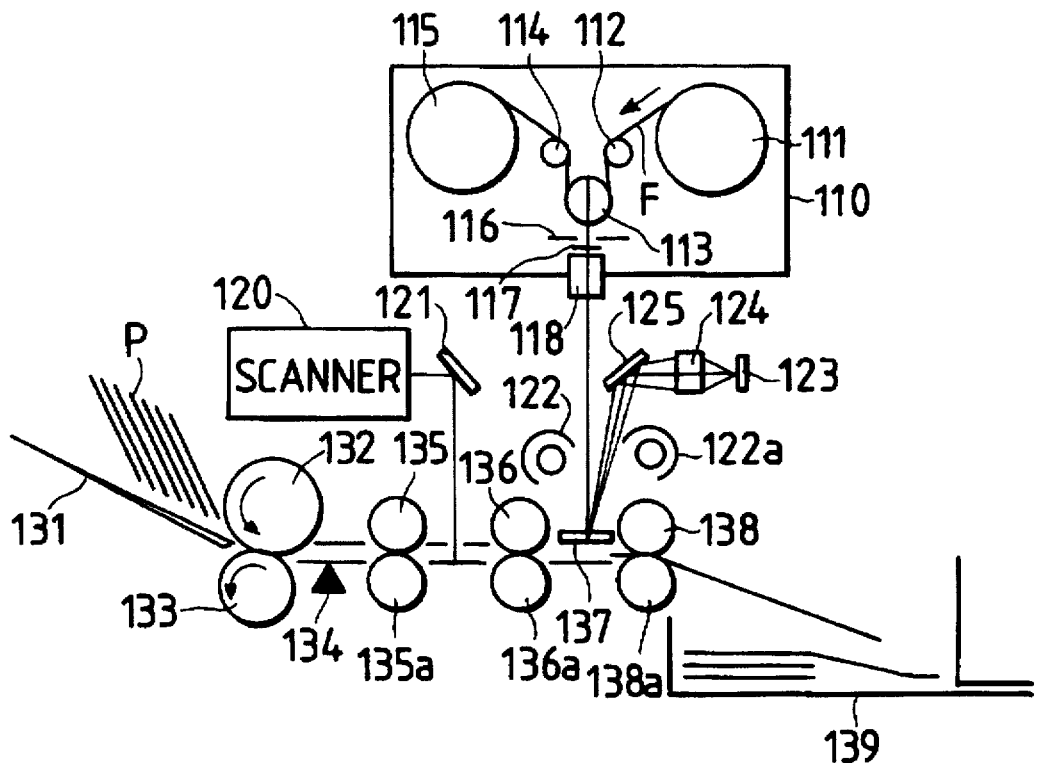
FIG. 6 is a schematic view of a fifth embodiment of the recording apparatus of the present invention, in which a rotary camera and an image reading device are combined.

FIG. 6 shows a fifth embodiment of the present invention, employing the combination of a microfilm camera and an image reader unit equipped with a photoelectric converter device.

There are illustrated a microfilm camera 110; a supply reel 111 for a film F; guide rollers 112, 114; a film drive roller 113 constituting a slit exposure area for the reduced image of the original on a film wound portion; and a takeup reel 115 for the exposed film. The film F is given a frontward tension by the takeup reel 15 and a rearward tension by the supply reel 111 by the rotation of the drive roller 113, whereby the film F is smoothly driven by a speed corresponding to the speed of the original divided by the reduction rate.

There are also shown a slit 116; a shutter 117; a lens 118 for focusing the image of the original onto the film F on the drive roller 113; a bar code scanner or an OCR scanner 120; a mirror 121 for deflecting the light from the original to the scanner 120; light sources 122, 122a for illuminating the original; and a line sensor (photoelectrical converting device) 123 on which the image of the original at the phototaking area is focused through a mirror 125 and a lens 124.

An original guide 131 for stacking the originals P, a feed roller 132 and a reverse separating roller 133 constitute an automatic sheet feeding mechanism. There are also provided a reflective original sensor 134; paired transport rollers 135, 135a, 136, 136a, 138, 138a positioned along the original transport path, with a scanner positioned between the rollers 135, 136 for reading the bar code on the original P and an upper glass guide 137 positioned between the rollers 136, 138 and constituting an original phototaking area; and a stacker 139.

In the above-explained configuration, the original P separated one by one from the stop by the feed roller 132 and the separating roller 133, is detected by the original sensor 134, then transported further by the transport rollers 135, 135a, identified with the scanner by the information provided in a particular part of the original P, transported by the transport rollers 136, 136a and illuminated by the light sources 122, 122a in passing under the upper glass guide 137. For an original P bearing predetermined identifying information, the shutter 117 of the camera 110 is opened, and the film drive roller 113 is driven by an unrepresented drive system to effect slit exposure, whereby the image of said original P is recorded by the microfilm camera. Also, an original P, identified as not having said information by the scanner 120, is imaged on the line sensor 123 through a mirror 125 and a lens 124, and the obtained electrical signal is subjected to image processing and recorded in an unrepresented memory.

Figure 7:
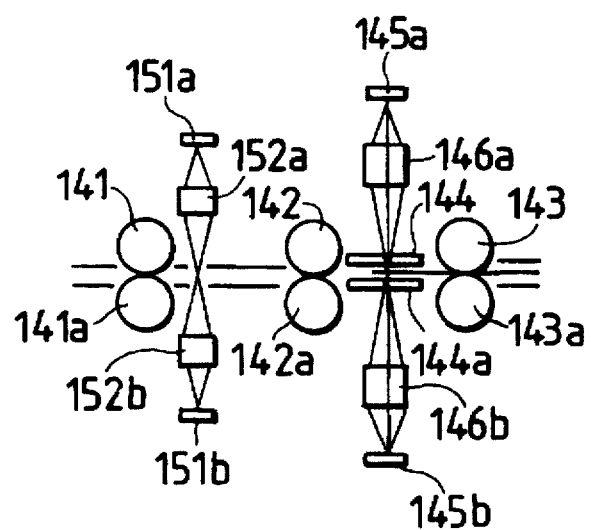
FIG. 7 is a schematic view of a recording means with object discrimination means, constituting a sixth embodiment of the present invention.

FIG. 7 illustrates a sixth embodiment of the present invention, only in the identifying and recording portions thereof.

Paired transport rollers 141, 141a, 142, 142a, 143, 143a are arranged along the original transport path, and between the paired transport rollers 141, 141a and 142, 142a there are provided a condenser lens 152a and a top face sensor 151a, and, across said transport path, another condenser lens 152b and a bottom face sensor 152b, for detecting the presence of an image on the top and bottom faces of the original. Also, between the paired transport rollers 142, 142a and 143, 143a there are provided an upper glass guide 144 and a lower glass guide 144a. Furthermore, there are provided, respectively at the upper and lower sides, an upper line sensor 145a on which an image is focused by a condenser lens 146a, and a lower line sensor 145b on which an image is focused by a condenser lens 146b.

This embodiment employs originals bearing the image on one face only, and said originals are transported with the image-bearing face up or down according to the kind of the originals. For example, the originals of a first group are transported with the image-bearing face upward, whereby the top face sensor 151a detects the presence of the image and the images of said originals are read by the line sensor 145a and recorded in a first memory. In this case, the bottom face sensor 151b does not detect the image, so that the line sensor 145b does not execute the image reading. Then the originals of a second group are transported with the image-bearing face downward, whereby the bottom face sensor 151b detects the presence of the image and the images of said originals are read by the line sensor 145b and recorded in a second memory. In this case, the line sensor 145a does not execute image reading. Thus, the originals of the first and second groups can be respectively recorded in the first and second memories, and the recording can thus be made on different recording media depending on the kinds of the originals.

In the above-explained configuration, when an original is transported, the amount of light reflected from the top face, illuminated by an unrepresented illuminating system, is measured by the top face sensor 151a, and that from the bottom face is measured by the bottom face sensor 151b. Whether the image or character information is present on the top or bottom face is identified from the reflected light amounts detected by said sensors 151a, 151b, and, according to the result of said identification, the image signal is obtained from the line sensor 145a or 145b and stored in the memory.

FIGS. 8A to 13 illustrate a seventh embodiment of the present invention.

Figure 8A:
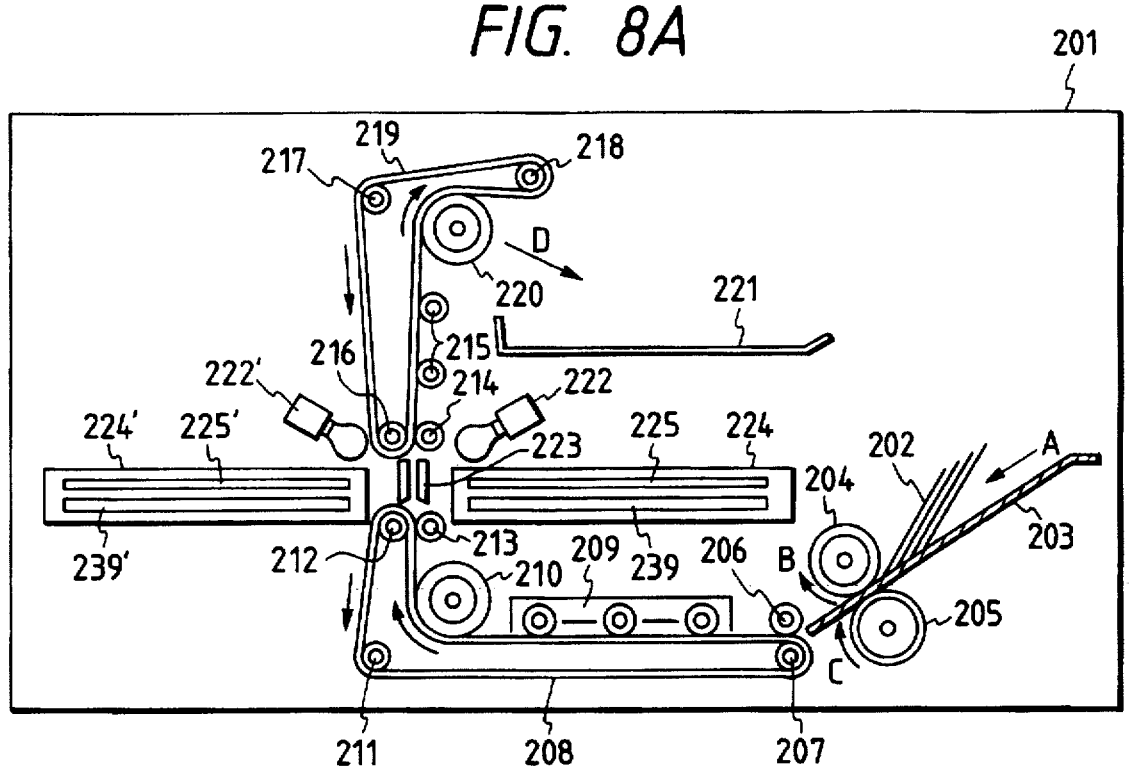
FIGS. 8A and 8B are respectively a schematic cross-sectional view and a block diagram of a seventh embodiment of the recording apparatus of the present invention.

FIG. 8A is a lateral view of an embodiment of the original transport system of a photographing apparatus 201 of the present invention. When originals 202 are placed on an inclined feeding tray 203, they move in a direction A by gravity. Said originals 202 are separated one by one and fed, by means of a feeding roller 204 rotated in a direction B and a reverse roller 205 rotated in a direction C. A lower belt 208, supported by belt rollers 207, 212, is given a suitable tension by a tension roller 211 and is driven by a lower drive roller 210, whereby the original 202 is transported by said lower belt 208.

An idler roller 206 and a guide unit 209 are provided for pressing the original to said lower belt 208.

The original is diverted from the horizontal direction to the vertical direction by said lower belt 208 and passes through an original guide glass 223.

In passing through said guide glass, the original 202 is illuminated on both sides by lamps 222, 222'. Above and below the guide glass 223 there are provided nip rollers 213, 214. An upper belt 219 supported by belt rollers 216, 218, is given a suitable tension by a tension roller 217, and is driven by an upper drive roller 220, thereby transporting the original after passing through the guide glass. Idler rollers 215 are provided for pressing the original to said upper belt 219. The original 202 is diverted from the vertical direction to the horizontal direction, and is discharged in a direction D into a stacking hopper 221.

On both sides of the guide glass 223, constituting the exposure area, there are symmetrically provided first mirrors 224, 224' at an angle of 45° to the plane of the vertically moving original 202. Said first mirrors 224, 224' are supported by a frame member (not shown) in the main body 201, in a similar manner as the shafts of the rollers for original transportation.

Figure 9:
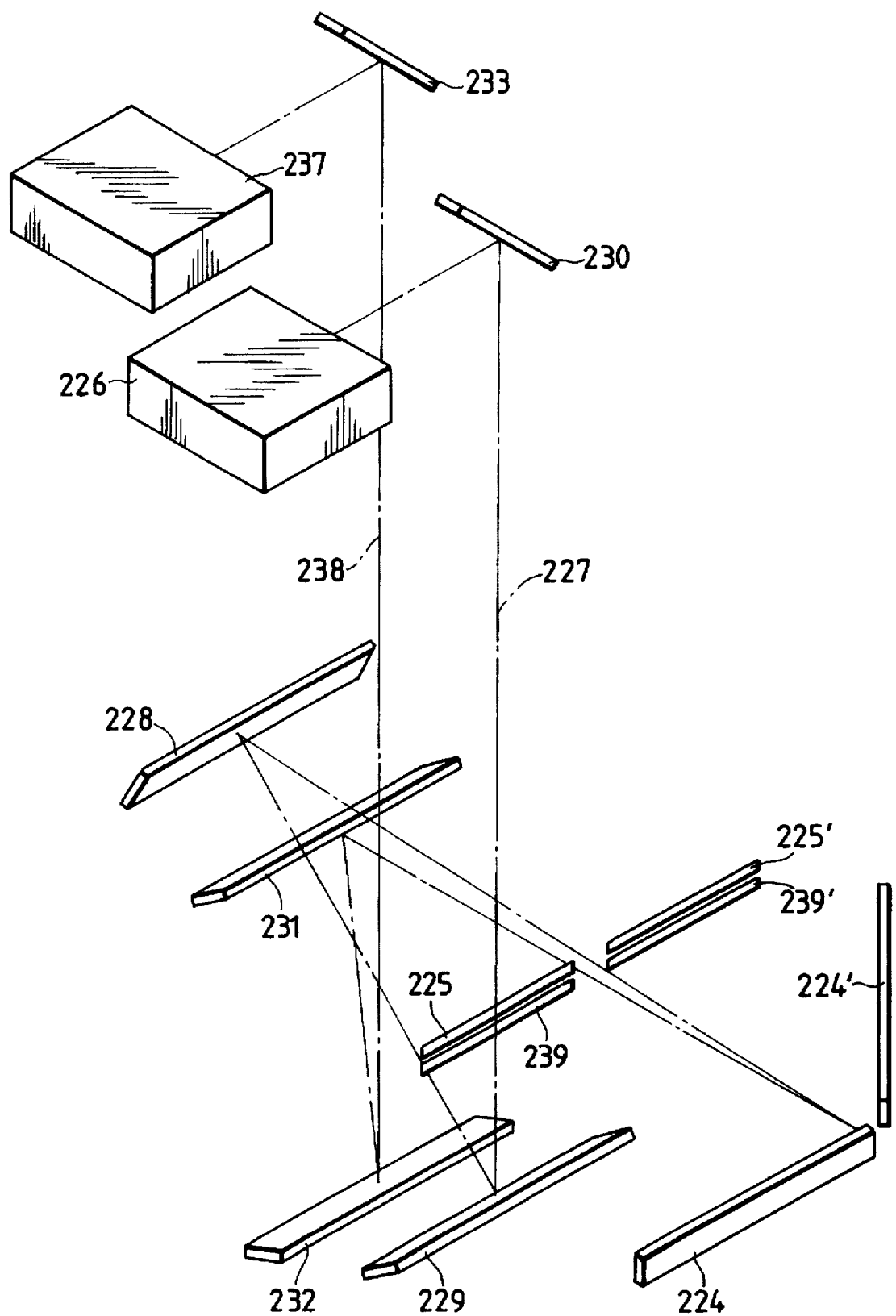
FIG. 9 is a perspective view of an optical system of said apparatus.

FIG. 9 is a perspective view of a configuration of the mirrors constituting the optical system of the present embodiment. In the exposure area, lights from the images on both sides of the original 202, illuminated by the lamps 222, 222' are reflected by the first mirrors 224, 224', and are guided through a first optical path 227 with slits 225, 225' to an analog camera 226 for analog recording on a photosensitive material (microfilm). In said first optical path 227, the lights passing through the slits 225, 225' are deflected obliquely downwards by a second mirror 228.

Figure 10:
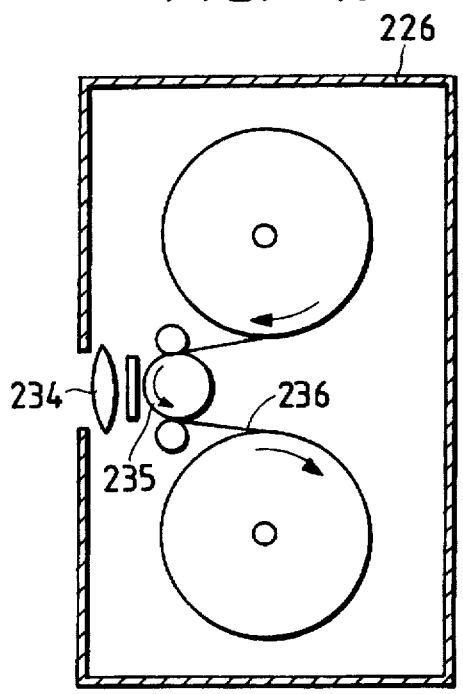
FIG. 10 is a schematic cross-sectional view of an analog camera in said apparatus.

Said light is then reflected upwards by a third mirror 229, further reflected frontward by a final fourth mirror 230, and is focused, by a lens 234 of an analog camera 226 shown in FIG. 10 onto a film 236 on a capstan 235.

Also, a second optical path 238, guiding to a digital camera 237 for photoelectric conversion, originates from an exposure position the same as that for the analog camera 226, and passes through slits 239, 239'. The optical path is then deflected obliquely downwards by a second mirror 231.

Figure 11:
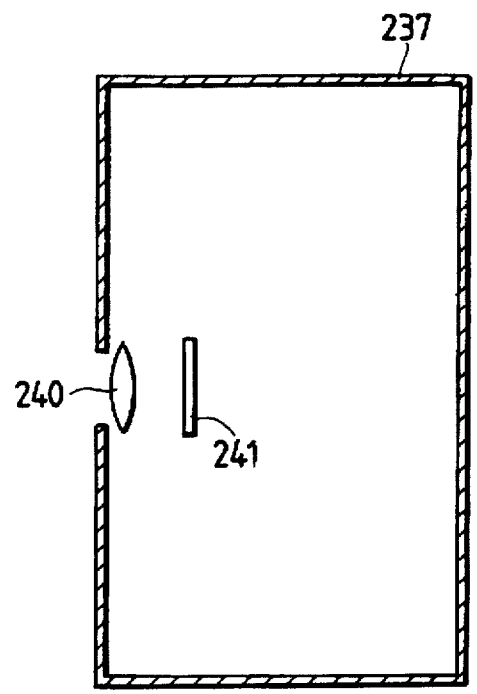
FIG. 11 is a schematic cross-sectional view of a digital camera in said apparatus.

The optical path is then deflected upwards by a third mirror 232, further deflected frontward by a final fourth mirror 233, and is focused onto a CCD 241 by a lens 240 of a digital camera 237 shown in FIG. 11.

FIG. 11 illustrates the digital camera 237 for photoelectric conversion. The light in the second optical path 238 is focused on the CCD 241 by the lens 240, whereby the image of the object is converted into electrical signals.

Although not illustrated, the digital camera 237 is provided with an electrical connection with the photographing apparatus 201, and the electrical signals obtained from the object image are sent to and recorded in a recording unit, comprised, for example of a floppy disk, a magnetic tape or a magnetooptical disk in said apparatus 201.

Figure 12:
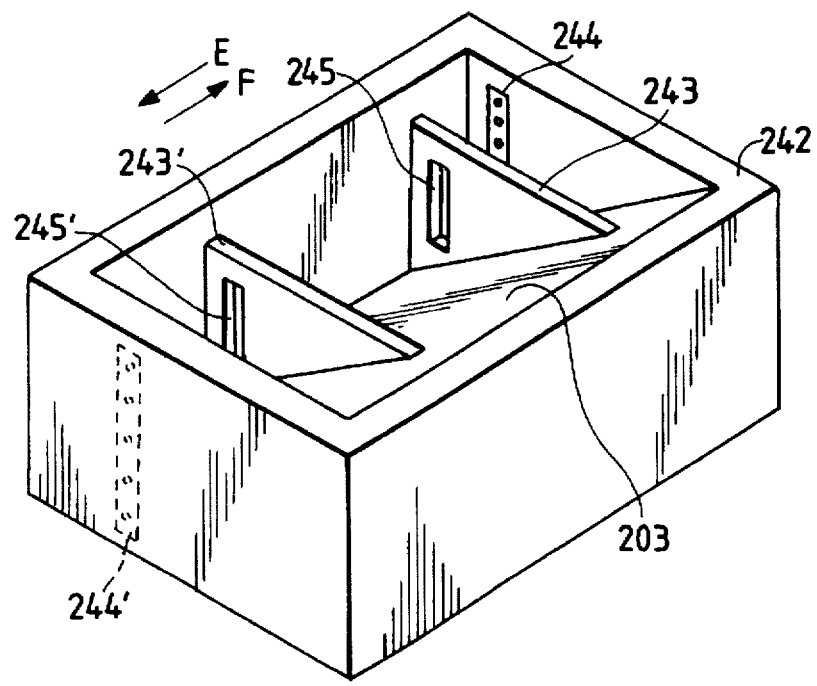
FIG. 12 is a perspective view of a sheet feeding unit of said apparatus.

FIG. 12 is a perspective view of an original feeding unit 242 of the present embodiment.

In said unit 242 there are provided guide members 243, 243' movable in directions E, F and serving to define the position of the originals in the direction of the width thereof. On a lateral face there is provided a light-emitting unit 244, consisting of plural light emitting elements. Also, on a lateral face in the direction E there is provided a light-receiving unit 244', and plural light beams from the light-emitting unit 244 in the direction E are guided to said light-receiving unit 244' through apertures formed in the guides 243, 243'. The light emitting unit 244 and the light-receiving unit 244' constitute original amount discriminating means K. When the originals 202 are stacked on the tray 203, they intercept the light beams according to the amount of said originals, whereby said amount can be discriminated.

Figure 13:
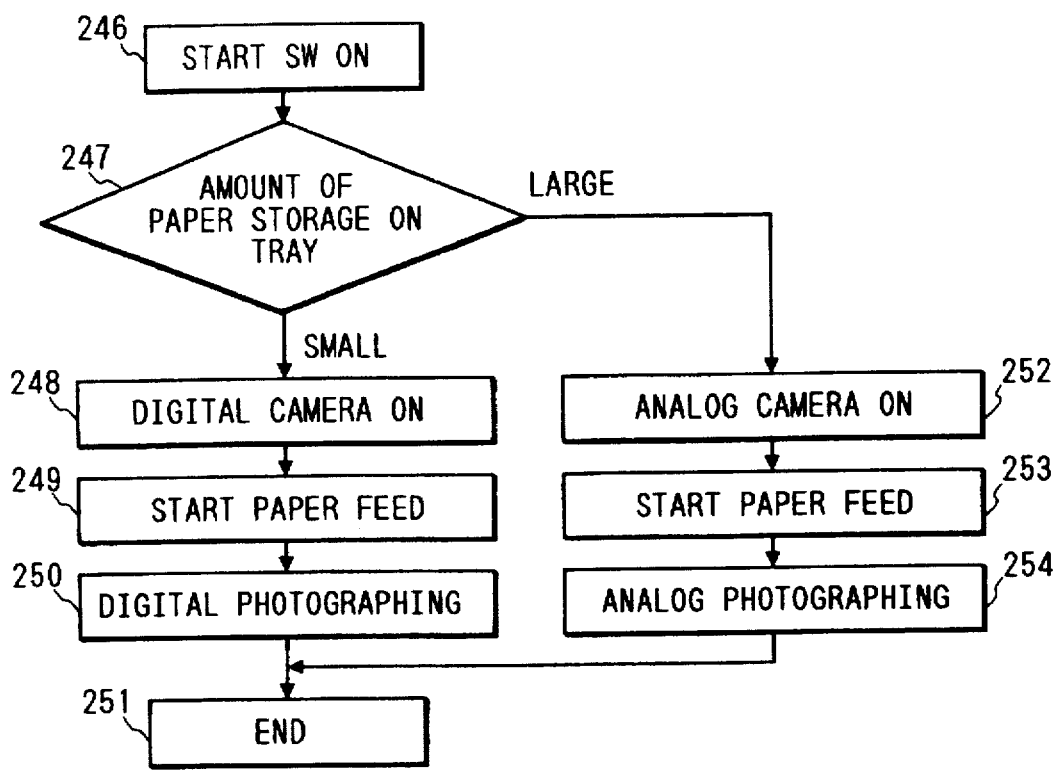
FIG. 13 is a flow chart of the control sequence of said apparatus.

FIG. 13 is a flow chart of the control sequence of the present embodiment.

Figure 8B:
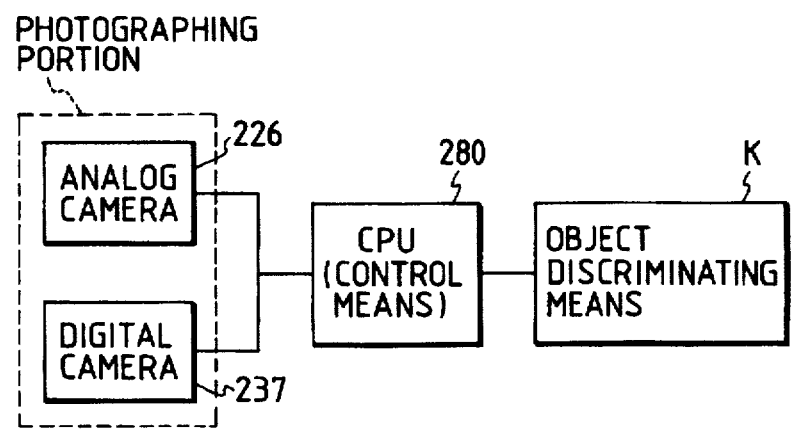

When a start switch is actuated in a step 246 after the stacking of the originals on the tray 203 of the original feeding unit 242, a CPU 280, incorporated in the apparatus 201 and serving as control means FIG. 8(B), discriminates whether the amount of the originals on the tray 203, detected by the discrimination means K shown in FIG. 12, is smaller or larger than a value stored in advance in the CPU 280 (step 247). If the detected amount of the originals is less than the stored value, the digital camera 237 is activated in a step 248, and the original feeding is started in a step 249. Thus, the original image is converted into an electrical signal by the digital camera (step 250), and the function of the apparatus is terminated after the original is discharged (step 251).

On the other hand, if the amount of the originals on the tray 203 is larger than the previously stored value (step 247), the analog camera 226 is activated (step 252) and the original feeding is started (step 253), whereby the object image is recorded on the photosensitive material in the analog camera 226 (step 254). The function of the apparatus is terminated after the discharge of the original (step 251).

In the following there will be explained an eighth embodiment of the present invention, wherein the same components as those in the seventh embodiment will be represented by the same numbers and will not be explained further.

Figure 14:
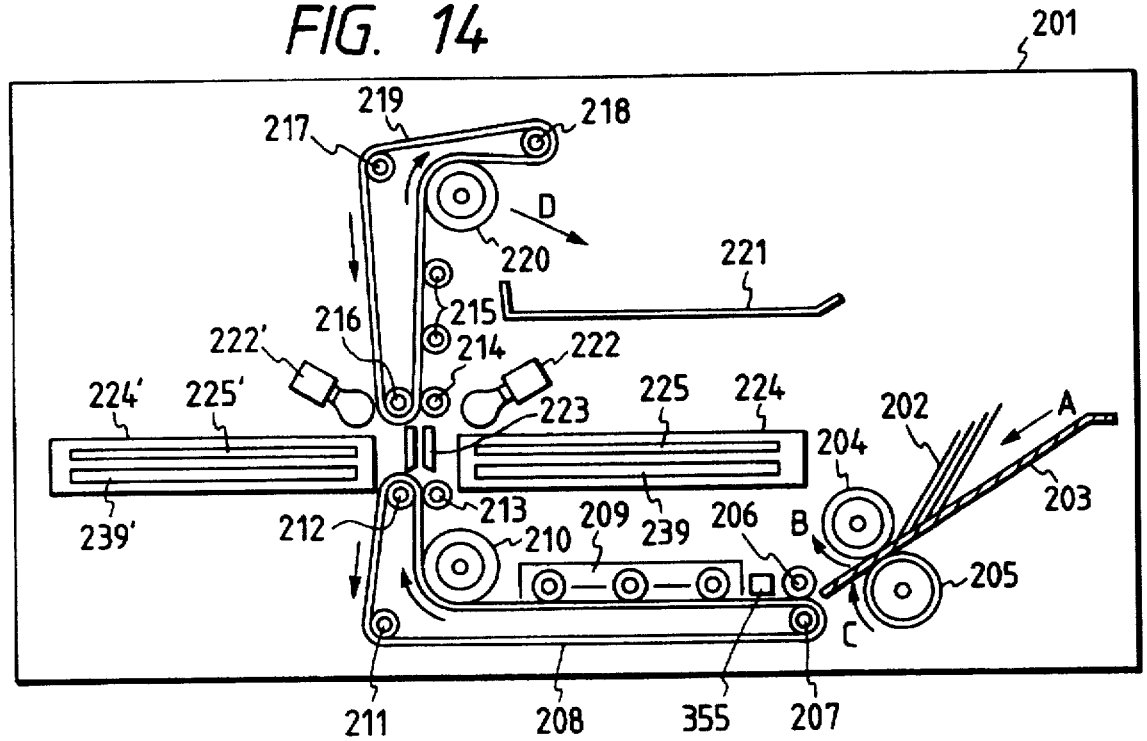
FIG. 14 is a schematic cross-sectional view of an eighth embodiment of the recording apparatus of the present invention.

FIG. 14 shows a photographing apparatus the same as that shown in FIG. 8, except that a color sensor 355, serving as color identifying means, is positioned immediately after the idler roller 206. Said color sensor 355 is capable of discriminating whether the original image is colored or black-and-white, by reading said image through filters of red, yellow and blue.

Figure 15:
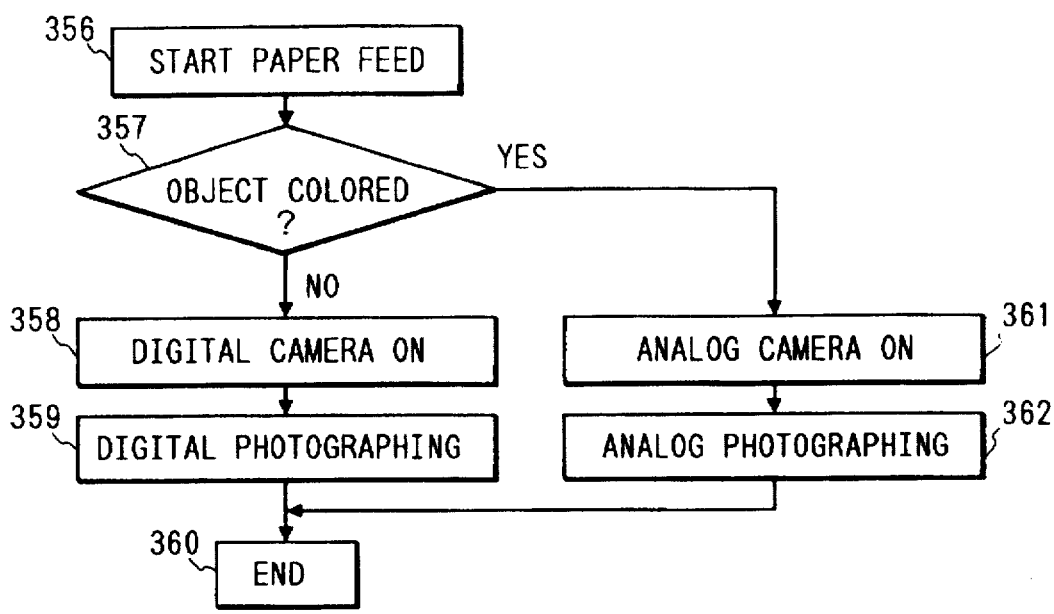
FIG. 15 is a flow chart of the control sequence of said apparatus.

FIG. 15 is a flow chart showing the control sequence of the apparatus shown in FIG. 14.

When an original is supplied in a step 356 and passes through the color sensor 355, a CPU 280 incorporated in the apparatus 201 discriminates whether the original is colored or black-and-white (step 357), and, if it is identified as black-and-white, the digital camera 237 is activated (step 358) to effect the photoelectric conversion of the original image (step 359). The function of the apparatus is terminated after the discharge of the original (step 360).

On the other hand, if the CPU 280 identifies a colored original in the step 357, the analog camera 226 is activated (step 261) to expose the photosensitive material to the object image (step 262). The function of the apparatus is terminated after the discharge of the original.

In the above-explained embodiment, a color film may be loaded in the analog camera 226 if the colored image is to be recorded in a colored state.

Figure 16:
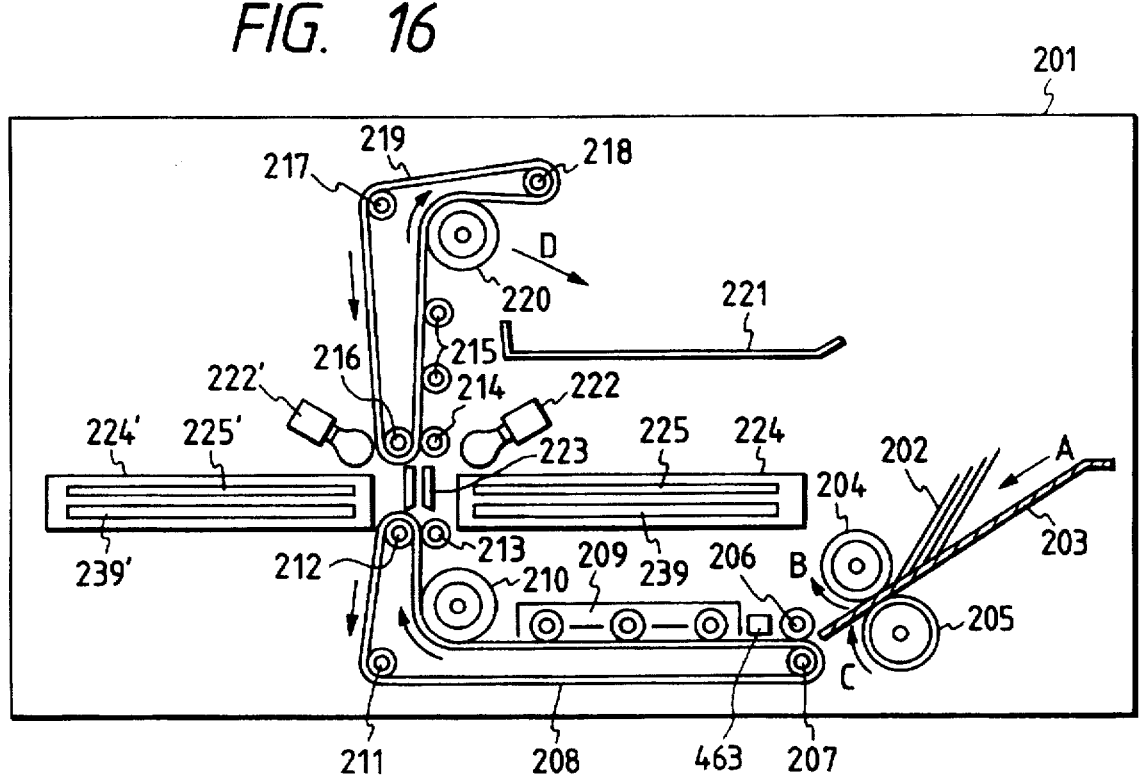
FIG. 16 is a schematic cross-sectional view of a ninth embodiment of the recording apparatus of the present invention.

FIG. 16 shows a photographing apparatus the same as that in FIG. 8 except that an image sensor 463 is positioned immediately after the idler roller 206.

The image sensor 463 is comprised of an array of plural photosensors such as a CCD, and is capable of reading the image information of the original, thereby enabling the CPU 280 to identify the amount of image information on the original and the presence or absence of a halftone image area therein.

Figure 17:
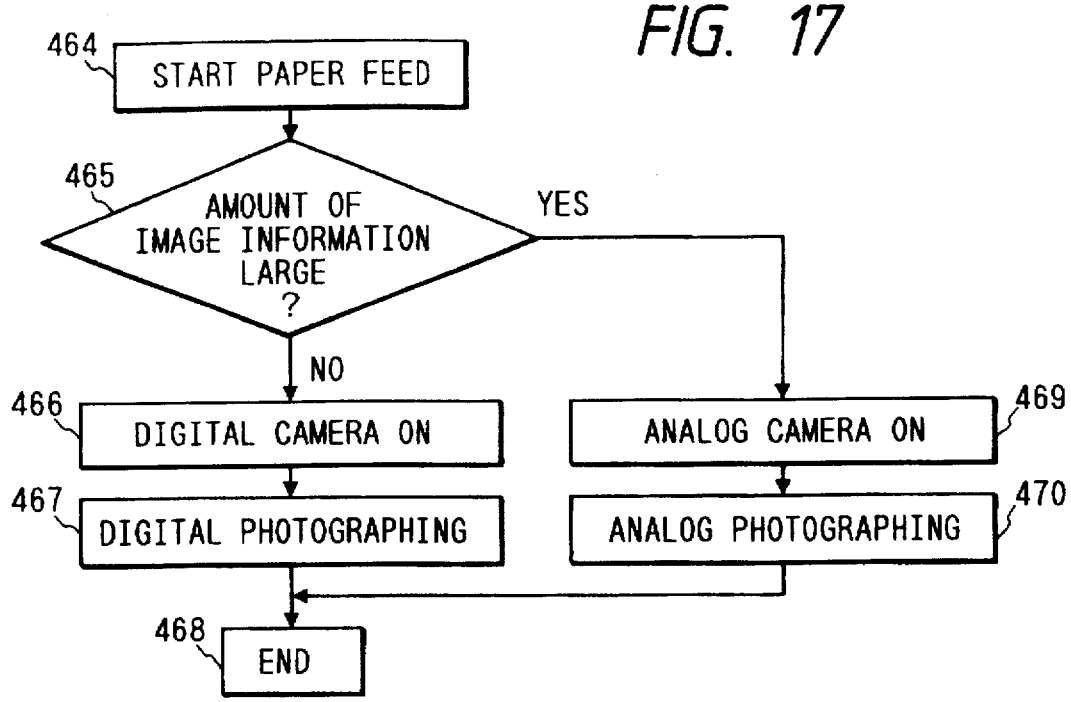
FIG. 17 is a flow chart of the control sequence of said apparatus.

FIG. 17 is a flow chart of the control sequence of the apparatus shown in FIG. 16.

When the original is fed in a step 464 and passes through the image sensor 463, the CPU 280 incorporated in the apparatus 201 discriminates, through the image sensor 463, the amount of image information on the original and the presence or absence of a halftone area therein (step 465), and, if said amount of image information and said halftone area are smaller than values previously stored in the CPU 280, the digital camera is activated (step 466) to effect photoelectric conversion of the original image (step 467). The function of the apparatus is terminated after the discharge of the original (step 468).

On the other hand, if the amount of image information and the halftone area are identified larger in the step 465 than the previously stored values in the CPU 280, the analog camera is activated (step 469) to expose the photosensitive material to the original image (step 470). The function of the apparatus is terminated after the discharge of the original.

In the present embodiment, the image sensor 463 is positioned immediately behind the idler roller 206, but it is also possible to effect the function of said image sensor by the CCD 241, serving as the photoelectric converter for the digital camera, by separating the exposure areas for the digital camera and for the analog camera and positioning the exposure area for the analog camera at the downstream side of that for the digital camera.

The above-explained plural embodiments may be practiced individually, but they may also be practiced in various combinations for achieving further improvement and optimization in the recording speed.

Figure 18:
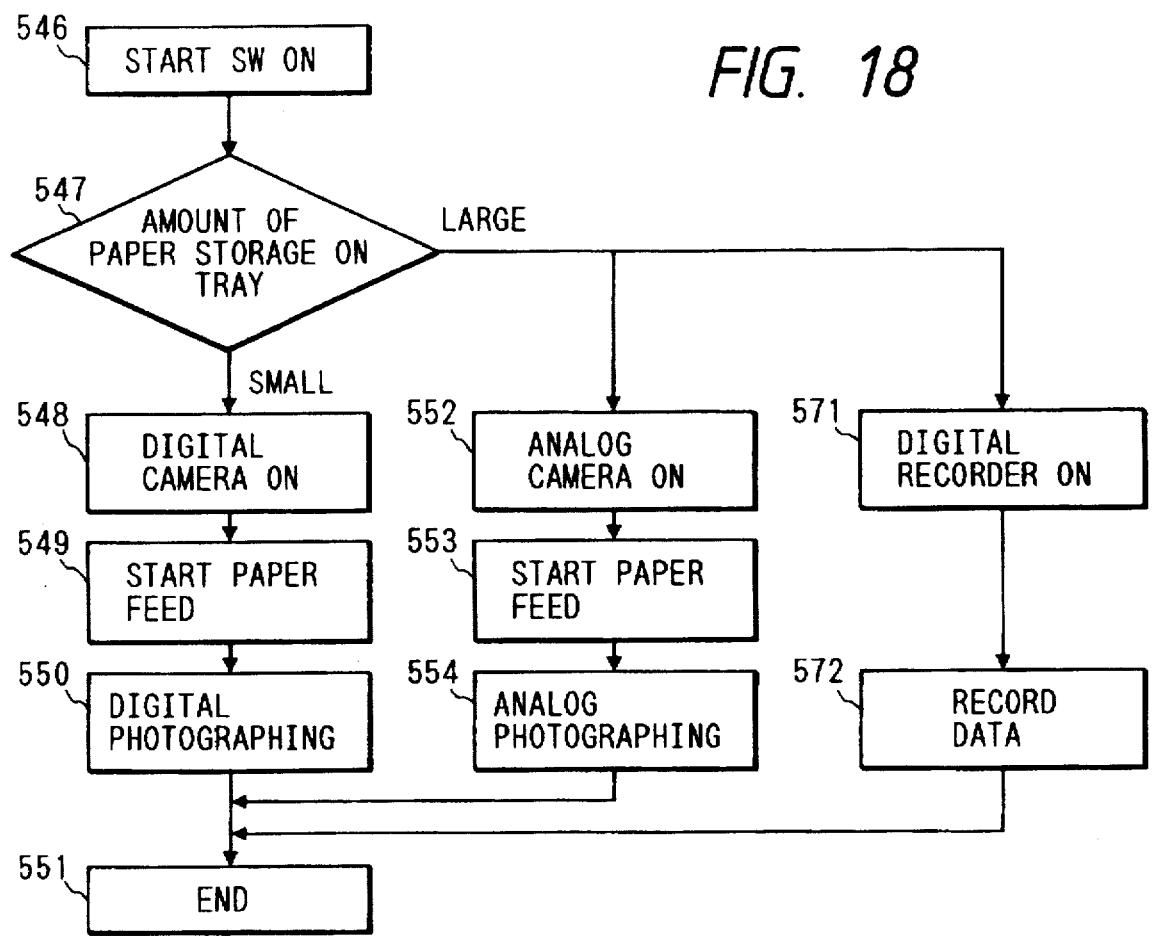
FIG. 18 is a flow chart of the control sequence of a tenth embodiment of the recording apparatus of the present invention.

FIG. 18 is a flow chart showing the control sequence of an embodiment employing the apparatus shown in FIGS. 8A to 13, wherein the same steps as those in FIG. 13 are represented by the same numbers.

In the present embodiment, if the amount of the originals stacked on the feed tray is large, the analog camera is activated in a step 552 and the digital camera is also activated in a step 571. Thus, parallel to the original feeding and the analog recording steps 553, 554, a step 572 causes the digital recording unit to record the number of the originals recorded by the analog recording unit, retrieval information entered from an unrepresented keyboard, cartridge number, etc.

In case the amount of originals stacked on the feed tray is smaller and the originals are recorded by the digital camera, the above-mentioned information is naturally recorded in the digital recording unit.

Figure 19:
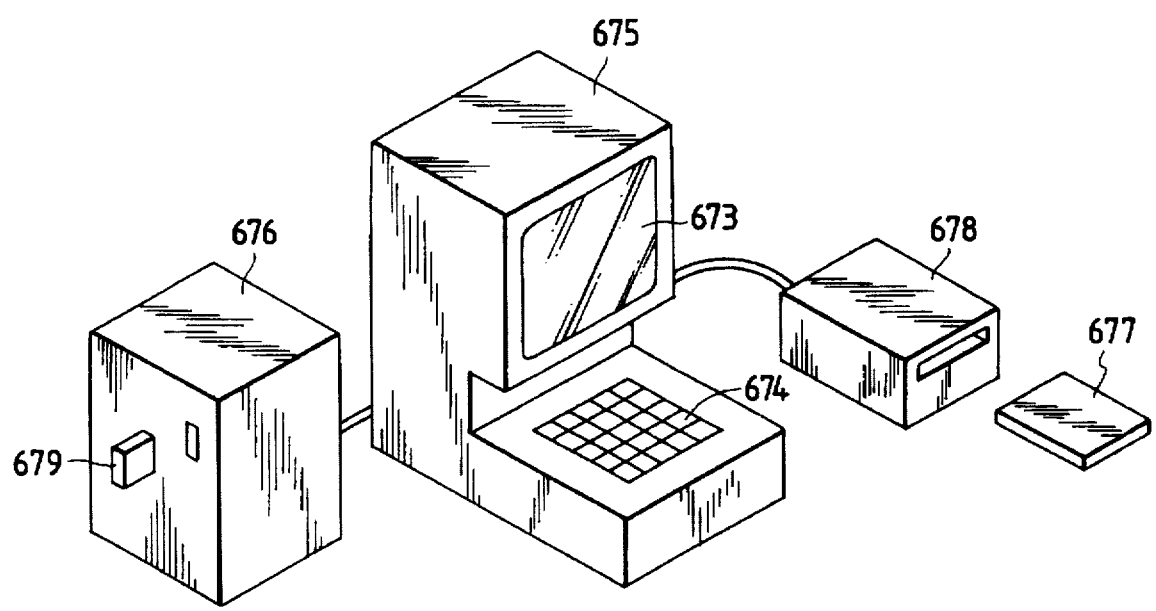
FIG. 19 is a schematic view of said apparatus.

Therefore, in a system shown in FIG. 19 capable of mutual communication among a central control unit 675 equipped with a display 673 and a keyboard 674, a digital converter 676 incorporating an analog recorded film cartridge 679 and capable of digitizing the analog image, and a disk reader 678 incorporating a disk 677 containing digital recording of the image and retrieval information and capable of releasing the data of said disk, the retrieving operation can be executed according to the retrieving information of the disk reader 667 in response to data entered from the keyboard of the central control unit 675. Thus, if the desired image is analog recorded, said image is sent through the digital converter to the central control unit 675, while, if the desired image is digitally recorded, said image is sent through the disk reader 678 to the central control unit 675.

Thus, the above-explained configuration realizes integrated control of an analog-recording film and a digital-recording disk, based on the retrieving information recorded on said disk.

As explained in the foregoing, the present invention serves to dispense with the conventional cumbersome operations of a replacement of camera unit or scanner unit, by automatic selection of the recording method or mode based on the identification of the object by its size, length or width, or by reading of the information provided on the object. The present invention also, allows a single equipment to automatically handle the jobs of plural business sections, and realizes proper filing without errors.

Also the present invention enables recording with an appropriate reduction rate or an appropriate resolving power, according to the size of the object.

Furthermore, the present invention provides a recording apparatus including an analog recording unit for analog recording on a photosensitive material and a digital recording unit for photoelectric conversion and recording, with object discriminating means, and enables improvement and optimization of the recording speed through automatic switching of said recording units.

Said discriminating means may use the amount of stacked originals on the feeding unit, in order that the originals of a small amount can be recorded in digital form for easier retrieval and those of a large amount can be recorded on a film which is characterized by a faster recording speed and superior storage property.

Also, said discriminating means may be so designed as to discriminate whether the object image is colored, and a color image may be recorded by the analog recording unit in order to prevent deterioration in image quality such as image dropout or a Moire pattern generated in the image compression in digital recording, and to prevent an excessive load on the memory capacity of the digital recording unit resulting from such a color image.

Furthermore, color recording of a colored original can be inexpensively achieved by loading the analog camera with a color film.

It is furthermore possible to use the amount of image information on the object image for discriminating the original, and to record the image with a large amount of image information by the analog recording unit, thereby reducing the burden on the digital recording unit and preventing a so-called overflow phenomenon in which the amount of image information is excessively high so that the phototaking and recording in the digital phototaking and recording units cannot cope with said image information.

The configuration may be further simplified by utilizing the digital recording unit itself for the detection of the amount of image information.

The above-mentioned methods, practiced individually or in combination, provide the ability to record the object, images of a larger number of retrieving items in a one cartridge in case of a tape-shaped recording medium such as a VCR tape, an 8 mm tape or a DAT, or in one disk in a case of a disk-shaped recording medium such as an optical disk or a magnetooptical disk, thereby enabling rapid retrieval of varied items, exploiting the advantage of the digital recording.

Also, in case there exist many originals for a retrieving item or in case of a color image or a halftone image with a large amount of image information, there is employed analog recording, exploiting the advantage thereof enabling high-speed recording.

Also, by storing the retrieving information of the analog recorded objects, such as the retrieving items, number, of frames, cartridge number etc. in the digital recording unit collectively with the digitally recorded image information, it is rendered possible to integrally administer the analog recording media such as microfilms, utilizing the digital recording media such as a disk or a tape.

What is claimed is:

1. A recording apparatus comprising:
   first recording means for recording an image of an original by exposing the image onto a film and recording the exposed image on the film in a reduced scale;
   second recording means for recording an image on an original by reading the image and converting the read image to image data for being memorized into a memory;
   discrimination means for automatically discriminating a type of the original based on an amount of information on the original, and generating one of a first signal for actuating said first recording means and a second signal for actuating said second recording means corresponding to the discriminated type of the original; and
   selection means for automatically selecting one of said first and second recording means in accordance with the corresponding one of the first signal and the second signal from said discrimination means, to record the image of the original on one of the film and the memory by the selected one of said first and second recording means, respectively.

2. A recording apparatus according to claim 1, wherein said first and second recording means perform recording with respectively different magnifications.

3. A recording apparatus according to claim 1, wherein said first and second recording means are different from each other in recording method.

4. A recording apparatus according to claim 1, wherein said discrimination means comprises means for detecting a length of at least one side of the original and generating a signal corresponding to the detected length.

5. a recording apparatus according to claim 1, wherein said discrimination means comprises means for detecting information attached to the original and generating a signal corresponding to that information.

6. A recording apparatus according to claim 1, wherein said discrimination means comprises means for detecting an amount of one of a number of originals and information on the original to be recorded and generating a signal corresponding to that detection.

7. A recording apparatus according to claim 1, wherein said discrimination means comprises means for detecting a color of the original and generating a signal corresponding to the color detected.

8. A recording apparatus according to claim 1, wherein said first recording means is a camera for phototaking the image of the original on film, and said second recording means comprises (i) an image scanner for reading and converting the image of the original to an electrical signal, and (ii) means for recording the image on the second recording medium based on the electrical signal.

9. A recording apparatus according to claim 8, further comprising transport means for transporting the original along a predetermined path, and wherein said camera performs phototaking while the original is being conveyed and said image scanner performs reading while the original is being conveyed.

10. A recording apparatus according to claim 1, wherein said first recording means records the image with a first magnification, and said second recording means records the image with a second magnification.

11. A recording method according to claim 1, wherein said first and second recording means are different from each other in recording speed and in method for recording the image.

12. A recording apparatus according to claim 1, further comprising receiving means having a plurality of locations for receiving as recorded mediums the first and second recording mediums on which the image has been recorded and means for discharging the recorded mediums to different locations of said receiving means depending on the signal from said discrimination means.

13. A recording apparatus comprising:
    a plurality of recording units for recording an image of an original on a plurality of recording mediums, said recording units differing from each other in mode for recording the image of the original and comprising a first recording unit for recording the image of the original by exposing the image onto a film and recording the exposed image on the film in a reduced scale and a second recording unit for recording an image on an original by reading the image and converting the read image to image data for being memorized into a memory;
    discrimination means for automatically discriminating a type of the original and generating a signal corresponding to the type of the original; and
    control means for controlling said first recording unit and said second recording unit, said control means automatically selecting one of said first and second recording units in accordance with the signal from said discrimination means, to record the image of the original by the selected one of said first and second recording units.

14. A recording apparatus according to claim 13, wherein said discrimination means discriminates the type of the original by detecting information provided on the original.

15. A recording apparatus according to claim 13, wherein said discrimination means discriminates the type of the original by detecting a color of the image.

16. A recording apparatus according to claim 13, wherein said recording units record the image with different magnifications from each other.

17. A recording apparatus according to claim 13, wherein said discrimination means discriminates the type of the original by detecting a length of at least one side of the original.

18. A recording apparatus according to claim 17, wherein said recording units perform recording of the image with different magnifications from each other, the recording unit actuated by said control means being selected in accordance with the length of the original detected by said discrimination means, and performing recording of the image with a set magnification.

19. A recording apparatus according to claim 13, wherein
one of said recording units has a mode for recording by projecting the image on the first recording medium; and
another one of said recording units has a mode for recording by converting the image to an electrical signal and performing recording on the second recording medium based on the electrical signal.

20. A recording apparatus according to claim 19, wherein said one recording unit is an analog recording type camera; and
said other recording unit is a digital recording type camera.

21. A recording apparatus according to claim 13, wherein said discrimination means discriminates the type of the original by detecting one of the number of originals and an amount of information on the original.

22. A recording apparatus according to claim 13, wherein said discrimination means discriminates the type of the original by detecting a number of pixels of the image.

23. A recording apparatus according to claim 13, further comprising receiving means having a plurality of locations for receiving as recorded mediums the plurality of recording mediums on which the image has been recorded and means for discharging the recorded mediums to different locations of said receiving means depending on the signal from said discrimination means.

24. A recording apparatus comprising:
an original holding table for holding originals;
supplying means for supplying an original held on said original holding table to a reading position;
conveying means for conveying the original supplied by said supplying means to a discharge portion through the reading position;
a plurality of recording means for reading image information from the original located at the reading position and for recording the image information of the original on a plurality of recording mediums, said recording means differing in recording mode from each other and comprising first recording means for recording the image information of the original by exposing the image onto a film and recording the exposed image on the film in a reduced scale and second recording means for recording an image on an original by reading the image and converting the read image to image data for being memorized into a memory;
detecting means for automatically detecting a state of the original on the original holding table and producing a corresponding detection output; and
control means for controlling said first recording means and said second recording means, said control means automatically selecting one of said first and second recording means in accordance with the detection output from said detecting means, to record the image information of the original by the selected one of said first and second recording means.

25. A recording apparatus according to claim 24, wherein said detecting means detects a length of at least one side of the original.

26. A recording apparatus according to claim 24, wherein said detecting means detects one of a number of the originals held on said original holding table and an amount of image information on the originals held on said original storage table.

27. A recording apparatus according to claim 24, wherein said detecting means detects a color of the original.

28. A recording apparatus according to claim 24, wherein the recording modes of said recording means differ in magnification for recording the original.

29. A recording apparatus according to claim 24, wherein the recording modes of said recording means differ in method of recording the original.

30. A recording apparatus according to claim 24, wherein said plurality of recording means record the image information from one type of originals.

31. A recording apparatus according to claim 24, wherein said plurality of recording means record the image information from respectively different types of originals.

32. A recording apparatus according to claim 24, further comprising restricting means for controlling said conveying means to convey the originals to different positions of the discharge portion in accordance with the detection output from said detecting means.

33. A recording apparatus including at least two recording means, said apparatus comprising:
first recording means for recording an image of an original by exposing the image onto a film and recording the exposed image on the film in a reduced scale;
second recording means for recording an image on an original by reading the image and converting the read image to image data for being memorized into a memory;
detecting means for automatically detecting a length of at least one side of the original and generating one of a first signal for actuating said first recording means and a second signal for actuating said second recording means corresponding to the detected length; and
control means for automatically actuating one of said first and second recording means in accordance with the corresponding one of the first signal and the second signal from said detecting means, to thereby record the image of the original on one of the film and the memory by the selected one of said first and second recording means, respectively.

34. A recording apparatus comprising:
first recording means for recording an image of an original by exposing the image onto a film and recording the exposed image on the film in a reduced scale;
second recording means for recording an image on an original by reading the image and converting the read image to image data for being memorized into a memory;
discrimination means for automatically discriminating a type of the original and generating a signal corresponding to the type of the original detected; and
control means for automatically controlling said first recording means and said second recording means, said control means automatically selecting one of said first and second recording means in accordance with the signal from said discrimination means, to record the image of the original by the selected one of said first and second recording means.

35. A recording apparatus comprising:

first recording means for recording an image of an original by exposing the image onto a film and recording the exposed image on the film in a reduced scale;

second recording means for recording an image on an original by reading the image and converting the read image to image data for being memorized into a memory;

determining means for automatically determining an amount of information in the original and for generating a determination signal;

discrimination means for automatically discriminating a type of the original based upon the determination signal and automatically generating one of a first signal for selecting said first recording means when the determined amount of information is greater than a predetermined amount, and a second signal for selecting said second recording means when the determined amount of information is at most the predetermined amount; and selecting means for automatically selecting one of said first and second recording means in accordance with the corresponding one of the first signal and the second signal from said discrimination means, to record the image of the original on one of the film and the memory by the selected one of said first or second recording means, respectively.

36. A recording apparatus comprising:

first recording means for recording an image of an original by exposing the image onto a film and recording the exposed image on the film in a reduced scale;

second recording means for recording an image on an original by reading the image and converting the read image to image data for being memorized into a memory;

determining means for automatically determining an amount of the information in the original image and for generating a determination signal; and activating means for receiving the determination signal and automatically activating, in accordance with the determination signal, one of said first recording means and said second recording means to record information onto one of the film and the memory; respectively.

37. A recording apparatus comprising:

first recording means for recording an image of an original by exposing the image onto a film and recording the exposed image on the film in a reduced scale;

second recording means for recording an image on an original by reading the image and converting the read image to image data for being memorized into a memory;

discrimination means for automatically discriminating a type of the original by detecting whether the original contains identifying information, and for automatically generating one of a first signal for actuating said first recording means and a second signal for actuating said second recording means, in accordance with the discriminated type of the original; and control means for automatically controlling said first recording means and said second recording means, said control means automatically selecting one of said first and second recording means in accordance with the corresponding one of the first signal and the second signal from said discrimination means, and automatically controlling said first and second recording means to record the image of the original onto one of the film and the memory in accordance with the selected one of said first and second recording means, respectively.

* * * * *

UNITED STATES PATENT AND TRADEMARK OFFICE
CERTIFICATE OF CORRECTION

PATENT NO. : 5,717,442            Page 1 of 2
DATED : February 10, 1998
INVENTOR(S) : SHINJI MURATA, ET AL.

It is certified that error appears in the above-identified patent and that said Letters Patent is hereby corrected as shown below:

COLUMN 1:

Line 21, "that-for" should read --that for--; and
    Line 64, "retrival" should read --retrieval--.

COLUMN 2:

Line 2, "case a" should read --a case--;
    Line 40, "an" (second occurrence) should be deleted;
    Line 41, "of" should read --of an--; and
    Line 48, "a" should be deleted.

COLUMN 3:

Line 26, "2a" should read --2a,--; and
    Line 51, "respectively" should read --respectively,--.

COLUMN 5:

Line 56, "compactor" should read --compacter--.

COLUMN 8:

Line 43, "152b" should read --151b--.

UNITED STATES PATENT AND TRADEMARK OFFICE
CERTIFICATE OF CORRECTION

PATENT NO. : 5,717,442
DATED : February 10, 1998
INVENTOR(S) : SHINJI MURATA, ET AL.

It is certified that error appears in the above-identified patent and that said Letters Patent is hereby corrected as shown below:

COLUMN 12:

Line 40, "also," should read --also--; and
    Line 43, "Also" should read --Also,--.

COLUMN 13:

Line 17, "object," should read --object--;
    Line 18, "in a one" should read --in one--;
    Line 19, "in case" should read --in a case--;
    Line 31, "number," should read --number--; and
    Line 32, "number" should read --number,--.

COLUMN 14:

Line 3, "a" should read --A--.

COLUMN 18:

Line 9, "memory;" should read --memory,--.

Signed and Sealed this

Thirty-first Day of August, 1999

Attest:

Q. TODD DICKINSON

*Attesting Officer*     *Acting Commissioner of Patents and Trademarks*